UNITED STATES PATENT OFFICE.

EMIL FISCHER, OF BERLIN, GERMANY, ASSIGNOR TO C. F. BOEHRINGER & SOEHNE, OF WALDHOF, GERMANY.

ALKYL DERIVATIVES OF URIC ACID AND PROCESS OF MAKING SAME.

SPECIFICATION forming part of Letters Patent No. 616,700, dated December 27, 1898.

Application filed October 26, 1896. Serial No. 610,126. (Specimens.)

*To all whom it may concern:*

Be it known that I, EMIL FISCHER, a citizen of Germany, residing at Berlin, Germany, have invented certain new and useful Improvements in the Art of Obtaining the Alkyl Derivatives of Uric Acid; and I do hereby declare the following to be a full, clear, and exact description of the invention, such as will enable others skilled in the art to which it appertains to make and use the same.

The present invention relates to the art of obtaining the substitution products of uric acid, and particularly those in which one, several, or all of the hydrogen atoms of the imido groups of the uric acid are replaced by alkyls, or, in other words, in which uric acid has been partly or wholly alkylized.

Uric acid ($C_5H_4N_4O_3$) has the following structural formula:

$$\begin{array}{c}(1)HN-CO\\ | \quad |\\ CO \quad C-NH(3)\\ | \quad \| \quad \diagdown CO\\ (2)HN-C-NH(4).\end{array}$$

In this body alkyl radicals—such as methyl, ethl, or benzyl—may be substituted for one or several or all the hydrogen atoms. Thus, for example, if methyl be substituted for the hydrogen atoms marked (1) and (2) we have a dimethyl derivative of uric acid whose formula is:

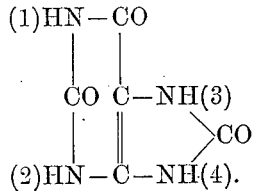

or if methyl be substituted for the hydrogen atoms marked (1,) (2,) and (4,) and benzyl be substituted for the hydrogen atom marked (3) we have 1,2,4-trimethyl 3-benzyl uric acid:

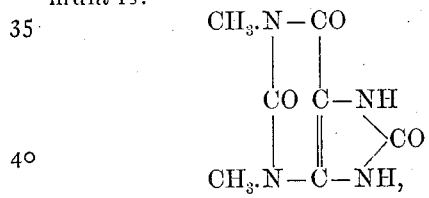

All such substitution products I class under the generic term of "alkyl derivatives of uric acid," and wherever this term occurs in this specification and in the claims it is to be understood as comprising all of these compounds. Hitherto such alkyl derivatives, so far as they have been obtained by alkylizing methods, have been produced in the dry way, the mono and dimethyl and ethyl substitution products, the only ones thus far produced by alkylizing methods applied to uric acid having been heretofore obtained exclusively by the reaction of the corresponding alkyl iodid upon dry urate of lead. These reactions have been carefully studied by Hill and Mabery, their observations being recorded in the *American Chemical Journal*, Vol. 2, page 305. (See also *Berichte der Deutschen Chemischen Gesellschaft*, Vol. 9, page 370.) From these reports it will be seen that according to this process methylation could be carried only as far as the monomethyl and dimethyl derivatives, according as the acid or neutral urate was employed. Further methylation of the uric acid has not been possible hitherto according to this method, and I was obliged to adopt the indirect method of first producing chlorated purins or chloro purins in order to obtain the trimethyl and tetramethyl uric acid. (*Berichte der Deutschen Chemischen Gesellschaft*, Vol. 17, pages 330 and 1782.) I have now discovered that the alkylization of uric acid or its homologues may be carried out in the wet way by causing a a hologen-alkyl compound, or, in other words, a haloid ether, such as methyl iodid ($CH_3I$) or methyl chlorid, to act on uric acid or its homologues mixed with an alkali by dissolving or suspending uric acid or its homologues in an alkalin bath, such as potash or soda lye. I have, moreover, discovered that other mixed alkyl derivatives of uric acid, such as the new compound benzyl-dimethyl-uric acid first produced by me may be prepared in generically the same manner by reacting upon an alkaline solution or mixture of the corresponding homologue of uric acid, such as alpha-dimethyl-uric acid by the corresponding haloid ether, such as benzyl chlorid ($C_6H_5.CH_2.Cl$) or ($C_7H_7.Cl$.)

My invention, therefore, broadly considered, is distinguished by the treatment of a uric acid with a haloid ether, such as iodid of methyl or ethyl or chlorid of benzyl or the like, together with an alkali.

When using the term "uric acid" in the specification and claims, I intend to cover thereby both uric acid proper and any alkyl uric acids—such, for instance, as monoalkyl-uric acid.

Another feature of my invention, moreover, consists in employing the wet way and in causing the haloid ether to act on the uric acid conjointly with the alkali; and the said invention, moreover, involves such other steps and methods as will be hereinafter set forth, and pointed out in the claims hereunto annexed.

This invention has the advantage that, as will be seen hereinafter, it results not only in the production of the lower alkyl derivatives of uric acid, but by repeated application it leads directly from uric acid to its tetraälkyl derivatives and, under some conditions, also to the trialkyl derivatives. It is, moreover, susceptible of many variations, so as to permit the production of numerous mixed alkyl derivatives of uric acid. It is much more convenient than the older methods, since it dispenses with the troublesome manufacture of the lead-salt of uric acid. Finally, it may be combined with the former methods by further alkylizing in the wet way the alkyl derivatives obtained in the dry way.

The following examples, which I at present consider the best manner of embodying my invention, will serve to fully illustrate the same, the proportions all being expressed by weight.

1. *Conversion of uric acid into alpha-monomethyl-uric acid.*—Twenty parts of uric acid are dissolved in thirteen hundred parts of water and two hundred and forty parts normal potash lye (KHO.Aq) and mixed with thirty-eight parts of methyl iodid. The mixture is maintained at a temperature of 100° centigrade in a digester for the space of two hours, the liquid being continually agitated. The following equations express the reaction taking place:

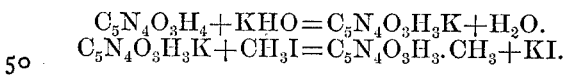

From this solution, to which a little hydrochloric acid is added, the alpha-monomethyl-uric acid (which is identical with the acid discovered by Hill and Mabery and which is probably the 1-monomethyl derivative) is precipitated as a crystalline powder after the solution has been cooled or allowed to cool. The reaction is not in exact accord with the theory in so far as the amounts of alkali and methyl iodid correspond to two molecules, and hence would be sufficient for the formation of dimethyl compounds. Experience, however, has shown that when employing less alkali or less of the methyl-halogen compound a portion of the uric acid remains unchanged and will remain mixed with the monomethyl derivative.

2. *Conversion of alpha-monomethyl-uric acid into tetramethyl-uric acid.*—This conversion takes place on the repeated action of methyl iodid on an alkaline solution of the acid. Three parts of alpha-monomethyl-uric acid, which may be obtained by the method set forth above under 1 or according to the method given by Hill and Mabery, (*American Chemical Journal*, Vol. 2, page 305,) are dissolved in thirty parts normal potash lye, (KOH.Aq,) and after 4.5 parts of methyl iodid have been added the whole is maintained at a temperature of about 100° centigrade in a closed vessel for one hour, the liquid being continually agitated. After cooling fifteen parts of normal potash lye and 2.3 parts of methyl iodid are again added, and the mixture is again heated to a temperature of about 100° centigrade and maintained there for one hour. The resulting clear solution is evaporated to dryness, and the residue is boiled with chloroform or similar solvents. On distilling off or otherwise removing the chloroform by evaporation or otherwise tetramethyl-uric acid remains in the form of a crystalline mass, which is obtained in a pure condition by crystallizing it once from alcohol or water. The reactions in forming this homologue of uric acid takes place according to the following equations:

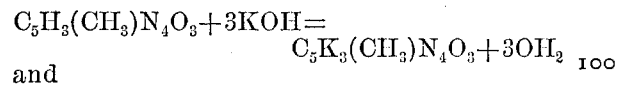
and
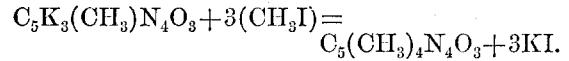

3. *Conversion of alpha-dimethyl-uric acid into tetramethyl-uric acid.*—Three parts (one molecule) of alpha-dimethyl-uric acid (which probably is the 1,4-dimethyl derivative) containing water of crystallization, which may readily be obtained from neutral urate of lead either by means of methyl iodid according to the directions given by Hill and Mabery or, as I have found, by means of methyl bromid or methyl chlorid, are dissolved in 28.2 parts of normal potash lye, (KOH.Aq,) and after having added five parts of methyl iodid (corresponding to two molecules) the mixture is maintained at about 100° centigrade for one hour in the manner described, the mixture being agitated or shaken. The yield of tetramethyl-uric acid is very plentiful. The reaction takes place according to the following equations:

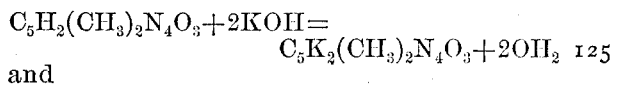
and
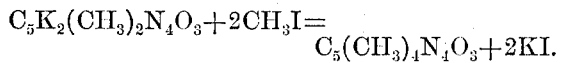

To obtain this reaction, it is not absolutely necessary to raise the temperature. It will take place also at the ordinary temperature, but in this case very much more slowly than when the temperature is raised, as indicated, so that it is necessary to shake or agitate for forty-eight hours instead of only for one hour. The yield of tetramethyl-uric acid, moreover, is not so good as in the first method if the above-given quantities of alpha-dimethyl-uric acid, potash lye, and methyl iodid are employed. If in lieu of the methyl iodid I employ a corresponding quantity of methyl bromid, the reaction will occur in the same manner. Methyl chlorid may also be employed for the same purpose in the place of the iodid.

4. *Conversion of beta-trimethyl-uric acid into tetramethyl-uric acid.*—This conversion takes place in substantially the same way as described in connection with the mono and dimethyl compounds. (The production of the 1.2.4 trimethyl-uric acid or beta-trimethyl-uric acid is described in *Berichte der Deutschen Chemischen Gesellschaft*, Vol. 28, page 2478.) If molecular quantities of the trimethyl-uric acid, alkali, and methyl iodid are employed, the reaction takes place with great perfection. The reaction is expressed in the following equations:

$$C_5H(CH_3)_3N_4O_3 + KOH = C_5K(CH_3)_3N_4O_3 + OH_2,$$

and $$C_5K(CH_3)_3N_4O_3 + CH_3.I = C_5(CH_3)_4N_4O_3 + KI.$$

5. *Conversion of alpha-dimethyl-uric acid into dimethyl-benzyl-uric acid.*—Two parts of alpha-dimethyl-uric acid are dissolved in fourteen parts normal potash lye and forty-two parts of water and boiled for one hour with 1.6 parts of benzyl chlorid, employing a reflux cooler for this purpose. The reaction which takes place is expressed in the following equation:

$$C_5HK(CH_3)_2N_4O_3 + C_6H_5.CH_2Cl = KCl + C_5H(C_6H_5.CH_2)N_4O_3.$$

A precipitate forms already during the boiling operation. The product is filtered after cooling and recrystallized from hot alcohol. This hitherto-unknown body, which has the formula $$C_5(CH_3)_2(C_6H_5CH_2)O_3,$$

melts at about 282° to 283° centigrade, is dissolved in about three hundred parts boiling alcohol, crystallizing therefrom in narrow glittering foliated crystals. It forms a crystalline silver salt. If this compound is dissolved molecule for molecule in normal potash lye and treated with methyl iodid in the same manner, it is converted into trimethyl-benzyl-uric acid, to be described below, thus affording another example under the generic process of converting uric acid or its alkyl derivatives into a higher alkyl derivative by the action of the corresponding haloid ether upon an alkaline mixture of the uric acid or derivative. This reaction proves that the hydrogen atom (3) has here been replaced by benzyl. Now, assuming that dimethyl-uric acid is a 1,4-dimethyl compound, the new dimethyl-benzyl derivative has the following structural formula:

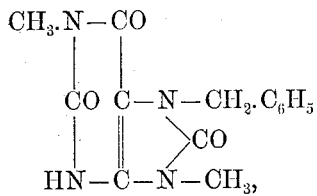

and may be termed "1,4-dimethyl 3-benzyl uric acid."

6. *Conversion of beta-trimethyl uric acid into 1,2,4-trimethyl 3-benzyl uric acid.*—One part of 1,2,4-trimethyl-uric acid or beta-trimethyl-uric acid is dissolved in 4.7 parts of normal potash lye and as much water and then digested for one hour with 0.7 parts of benzyl chlorid at substantially 100° centigrade. The process takes place according to the following equation:

$$C_5K(CH_3)_3.N_4O_3 + C_6H_5.CH_2.Cl = C_5(C_6H_5.CH_2)(CH_3)_3.N_4O_3 + KCl.$$

The new product is separated in the form of crystals already during the course of the process. It is first washed with dilute ammonia and the residue recrystallized from hot alcohol. The yield is very good. 1,2,4-trimethyl 3-benzyl uric acid, whose structural formula is:

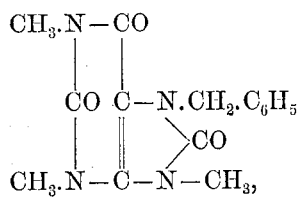

forms large coarse crystals, which melt at from 171° to 173° centigrade and are insoluble in alkalies.

While I have described the method of preparing trimethyl-benzyl-uric acid in illustration of the invention herein disclosed I do not herein claim the specific process or the product of the same, having made the same the subject of an application for Letters Patent, Serial No. 632,679, filed April 17, 1897.

The two alkyl derivatives last described, which contain the radical benzyl, are new bodies which have been first discovered and obtained and whose composition and properties have been first ascertained by me.

7. *Direct conversion of uric acid into alpha-trimethyl and tetramethyl uric acid.*—When the amounts of alkali and of methyl iodid are at once made sufficient to correspond each to four molecules with relation to the amount of uric acid, I have found that the greater portion of the uric acid will at once be converted into tetramethyl-uric acid without necessitating the repeated action of the alkali and haloid ether upon the uric acid. At the same time this modification results in the simultaneous formation of considerable amount of alpha-trimethyl-uric acid, which hitherto could only be obtained indirectly by first preparing chloro purins, as above stated, (*Berichte der Deutschen Chemischen Gesellschaft*, Vol. 17, page 1782.) In practice I carry out this modified process as follows: Fifty grams of uric acid are dissolved in eight hundred grams of potash lye of ten per cent. strength and eight hundred grams of water and heated with one hundred and eighty grams methyl iodid to 100° centigrade and maintained at this temperature for two hours while constantly shaking. The liquid is then acidified with acetic acid, then evaporated to dryness, and the residue is boiled or digested with chloroform. The tetramethyl-uric acid is thus brought into solution, while the undissolved residue contains the trimethyl-uric acid in the form of a potassium salt. The tetramethyl-uric acid is precipitated from the solution by hydrochloric acid and purified in the known manner. The yield of tetramethyl-uric acid is about seventy per cent. with reference to the uric acid employed.

In alkylizing uric acid in the wet way by acting upon the same with alkali and a haloid ether it is not necessary to completely dissolve the same. It is only necessary to suspend the same in a quantity of water insufficient for complete solution, preferably agitating this mixture and adding the alkali and the haloid ether; or I may suspend a solid urate, such as potassium urate, in an insufficient quantity of water and act upon the same, as before described, with a haloid ether. If, for example, five parts of the difficultly-soluble acid urate of potassium are mixed with seventy-five parts water and four parts methyl iodid and heated to 100° centigrade and maintained at this temperature for from three to four hours while continually shaking, a complete decomposition takes place, the resulting product being alpha-monomethyl-uric acid mixed with a very small quantity of regenerated uric acid.

The term "alkali," as used in this specification and in the claims, embraces not only the caustic alkalies—such as potassium hydrate, (KHO,) or sodium hydrate, (NaHO,) (or potash lye and soda-lye), &c.—but also the salts of the alkali metals (including ammonium) with the weaker inorganic acids—such as carbonic, boric, phosphoric acids, or organic acids, such as acetic acid. These salts having preponderating alkaline properties will also answer when the difficultly-soluble uric acid is merely suspended and not completely dissolved in the liquid. For example, in preparing alpha-monomethyl-uric acid I mix fifteen parts of uric acid with nineteen parts methyl iodid, three hundred parts water, and 9.2 parts potassium carbonate and heat the mixture to from 100° to 110° centigrade, maintaining it at this temperature for four hours, while constantly shaking. The yield is almost equal to the theoretical yield. If in this process in the place of the carbonate of potassium I employ twenty-six parts of borax or seventeen parts of triphosphate of sodium or thirteen parts of potassium acetate, the other conditions remaining the same, the reaction will proceed in the same way. The yield, however, is less, and the monomethyl-uric acid is mixed with variable amounts of unchanged uric acid.

8. *Conversion of alpha-monomethyl-uric acid into alpha-dimethyl-uric acid.*—The preparation of alpha-dimethyl-uric acid is carried out with equal facility if thirty-six parts of alpha-monomethyl-uric acid are heated in a closed vessel with one thousand parts of water and sixteen parts of carbonate of potassium and forty-three parts of methyl iodid to from 90° to 100° centigrade and maintained there for a period of three hours, the heated mixture being constantly shaken.

While I have herein described the method of preparing tetramethyl-uric acid by causing an alkali and a haloid ether to act on a uric acid in the proportion of four molecules each of the alkali and the haloid ether in exemplification of my invention, I have not herein specifically claimed this method, since the same is covered in my application, Serial No. 698,138, filed December 3, 1898, (No. 29;) nor do I herein claim, specifically, the process of acting upon a uric acid with an alkali and a haloid ether in the proportion of two molecules each of the alkali and the haloid ether to one molecule of the uric acid, nor the method of suspending the uric acid in the process of acting thereon with an alkali and a haloid ether, although I have described these processes in exemplification of my invention. These methods specifically are covered in my application, Serial No. 698,139, filed December 3, 1898, (No. 30.)

From the above description it will be seen that the process embodying my invention may be greatly varied without departing from the essence of the said invention, which, broadly considered, consists in acting, preferably, in the wet way upon uric acid or an alkyl derivative of the same, (or, briefly stated, upon a uric acid,) together with an alkali or upon an alkali salt of a uric acid with a haloid-ether or halogen-alkyl compound. Let it again be noted that the term "alkali" is to be taken in its broad sense, so as to include such substances as the carbonates of the alkali metals, borates, and other alkali salts with the weaker organic or inorganic acids, such as acetic and phosphoric acids—in other words, salts having preponderating alkaline properties. I do not, therefore, desire to be limited to the features described in illustration of my invention; but

What I claim, and desire to secure by Letters Patent, is—

1. In the art of preparing alkyl derivatives of uric acid, the process which consists in causing an alkali and a haloid ether to act upon a uric acid.

2. In the art of preparing alkyl derivatives of uric acid, the process which consists in causing an alkali and a haloid ether together with water to act upon a uric acid.

3. In the art of preparing the alkyl derivatives of uric acid, the process which consists in repeatedly causing a haloid ether to act upon a solution of a uric acid with an alkali solution.

4. In the art of preparing alkyl derivatives of uric acid, the process which consists in causing a haloid ether to act upon the mixture of a monoalkyl-uric acid with an alkali solution, then cooling and then adding more alkali and again acting on the mixture with a haloid ether, whereby the tetraälkyl-uric acid is obtained.

5. In the art of preparing the alkyl derivatives of uric acid, the process which consists in acting upon the mixture of an alkali solution and uric acid with a haloid ether, then cooling and separating the resulting monoalkyl derivative of uric acid, then acting on the mixture of the monoalkyl derivative and an alkali solution with a haloid ether, then cooling, then adding more alkali and acting on the mixture or solution with a haloid ether, whereby the tetraälkyl derivative of uric acid is obtained.

6. In the art of preparing alkyl derivatives of uric acid, the process which consists in dissolving a uric acid in water and caustic alkali and adding thereto a haloid ether.

7. In the art of preparing the alkyl derivatives of uric acid, the process which consists in acting upon the mixture of a uric acid and an alkali solution with an alkyl-halogen compound and heating the mixture.

8. In the art of preparing the alkyl derivatives of uric acid, the process which consists in acting upon the mixture of a uric acid and an alkali solution, with an alkyl-halogen compound and heating the mixture, then cooling and separating the resulting derivative, and then adding more alkali and alkyl-halogen compound and again heating.

9. In the art of preparing alkyl derivatives of uric acid, the process which consists in adding to a solution of uric acid in alkali a haloid ether.

10. In the art of preparing alkyl derivatives of uric acid, the process which consists in adding to a solution of uric acid in alkali, a haloid ether and heating the mixture.

11. In the art of preparing alkyl derivatives of uric acid, the process which consists in adding to a solution of uric acid in alkali, a haloid ether and heating the mixture and agitating the same while maintaining it in a heated condition.

12. In the art of preparing alkyl derivatives of uric acid, the process which consists in adding, to a solution of uric acid in a potash solution, methyl iodid and heating, then cooling, then separating the resulting monomethyl-uric acid and dissolving it in a potash solution and adding methyl iodid and heating, again cooling and again dissolving in a potash solution and adding methyl iodid and heating.

13. As a new chemical compound, dimethyl-benzyl-uric acid having the formula above given, having a melting-point of about 282° to 283°, centigrade, which is soluble only with difficulty in alcohol and crystallizes therefrom in narrow, glittering, foliated crystals.

In testimony whereof I affix my signature in presence of two witnesses.

EMIL FISCHER.

Witnesses:
W. HAUPT,
HENRY HASPER.